UNITED STATES PATENT OFFICE.

IVAN LEVINSTEIN AND CARL MENSCHING, OF MANCHESTER, ENGLAND, ASSIGNORS TO LEVINSTEIN, LIMITED, OF MANCHESTER, ENGLAND.

BENZYLNAPHTHYLAMIN-SULFONIC ACID AND PROCESS OF MAKING SAME.

SPECIFICATION forming part of Letters Patent No. 722,861, dated March 17, 1903.

Application filed December 22, 1902. Serial No. 136,266. (No specimens.)

*To all whom it may concern:*

Be it known that we, IVAN LEVINSTEIN, a subject of the King of Great Britain and Ireland, and CARL MENSCHING, Ph. D., a subject of the German Emperor, both residing at Manchester, in the county of Lancaster, England, have invented new and useful Improvements in the Manufacture of Benzylnaphthylamin-Sulfonic Acid and Process of Making the Same, of which the following is a specification.

We have found that a new benzylnaphthylamin-sulfonic acid is produced when $alpha_1$-$alpha_4$naphthylamin-sulfonic acid is heated with benzyl chlorid under suitable conditions hereinafter described. The new acid combines with diazo derivatives of amidoazo compounds, giving rise to a very valuable series of polyazo coloring-matters which produce on wool shades which are much bluer and brighter than those which are produced by the corresponding coloring-matters from the unbenzylated acid.

In illustration of our process for the production of the new $alpha_1$ $alpha_4$naphthylamin-sulfonic acid we give the following example: Sixty-five pounds of $alpha_1$ $alpha_4$ naphthylamin-sulfonic acid are dissolved with thirty-five pounds of potassium carbonate in one thousand pounds of water by boiling in a reflux apparatus, and there is slowly introduced into the boiling liquor 33.5 pounds of benzyl chlorid, the mixture then being allowed to boil for eight hours. The new acid is then precipitated by the addition of mineral acid to the liquor and is filtered off. When necessary, it may be purified by dissolving in alkalies and reprecipitating with acids.

Instead of potassium carbonate an equivalent molecular proportion of caustic potash or of caustic soda may be employed, in which case the benzylation will take place at a temperature of from 30° to 50° centigrade, and the use of a reflux apparatus is unnecessary.

What we do claim as our invention, and desire to secure by Letters Patent, is—

1. The hereinbefore-described process for the production of a new benzylnaphthylamin-sulfonic acid which consists in heating $alpha_1$-$alpha_4$naphthylamin-sulfonic acid with benzyl chlorid, substantially as set forth.

2. The new benzylnaphthylamin-sulfonic acid which is produced by heating $alpha_1$ $alpha_4$naphthylamin-sulfonic acid with benzyl chlorid, and which by combination with diazo derivatives of amidoazo compounds produces on wool shades which are much brighter and bluer than are produced by the corresponding colors from the unbenzylated acid.

In testimony whereof we have signed our names to this specification in the presence of two subscribing witnesses.

IVAN LEVINSTEIN.
    CARL MENSCHING.

Witnesses:
    WILLIAM E. HEYS,
    GEORGE MOHL.